United States Patent [19]

Chelminski

[11] Patent Number: 5,615,170
[45] Date of Patent: Mar. 25, 1997

[54] METHOD, SYSTEM AND APPARATUS FOR SELECTIVELY SHUTTING OFF LEAKAGE OF COMPRESSED AIR IN MARINE SEISMIC AIRGUN ARRAYS HAVING COMMON SUPPLY HOSES FOR MULTIPLE AIRGUNS

[75] Inventor: Stephen Chelminski, Fitzwilliam, N.H.

[73] Assignee: Bolt Technology Corporation, Norwalk, Conn.

[21] Appl. No.: 512,660

[22] Filed: Aug. 8, 1995

[51] Int. Cl.$^6$ .............................. G01V 1/38; F16K 31/02
[52] U.S. Cl. ......................... 367/15; 367/144; 181/120; 251/129.07; 251/129.02
[58] Field of Search ................... 367/15, 144; 181/120; 251/129.07, 129.02

[56] References Cited

U.S. PATENT DOCUMENTS

| | | | |
|---|---|---|---|
| 3,588,039 | 6/1971 | Chelminski et al. | 251/141 |
| 3,818,927 | 6/1974 | Zeuner | 137/110 |
| 4,038,630 | 7/1977 | Chelminski | 340/7 R |
| 4,210,222 | 7/1980 | Chelminski et al. | 181/107 |
| 4,240,518 | 12/1980 | Chelminski | 181/107 |
| 4,599,712 | 7/1986 | Chelminski | 367/144 |
| 4,757,482 | 7/1988 | Fiske, Jr. | 367/144 |
| 4,791,958 | 12/1988 | Brundage | 251/129.02 |
| 5,212,669 | 5/1993 | Jenkins | 367/144 |
| 5,413,308 | 5/1995 | Hayes | 251/77 |
| 5,506,818 | 4/1996 | Johnston | 367/144 |

*Primary Examiner*—J. Woodrow Eldred
*Attorney, Agent, or Firm*—Parmelee, Bollinger & Bramblett; G. Kendall Parmelee

[57] ABSTRACT

For marine seismic surveying using an array of airguns towed behind a survey ship, wherein a common high pressure hoseline supplies compressed air to a multitude of airguns, a method, system and apparatus selectively shut off air flow to any airgun for stopping leakage of compressed air from the common supply line. Shutoff valves are employed with a respective valve being upstream of each airgun to enable selectively shutting off compressed air flow from the common supply line to any airgun for stopping loss of compressed air from the common line caused by leakage from a leaking component downstream from any valve, such as a ruptured feeder hoseline to an airgun. Each shutoff valve has a spring whose spring force biases open its valve. Simultaneous electrical energization of windings in all shutoff valves electromagnetically overcomes the spring force for simultaneously closing all valves. The spring force is selected to be capable of overcoming valve friction for opening a closed valve when pressures can be equalized downstream and upstream of the closed valve because no leakage is occurring downstream of the closed valve and also is selected to be unable to open a closed valve when pressures downstream and upstream of the closed valve are unequalizable due to leakage occurring downstream of the closed valve. Thus, after the leakage has been selectively shut off, air pressure in the common supply hose rises to its normal working level, and seismic surveying can proceed with minimal delay.

22 Claims, 5 Drawing Sheets

METHOD, SYSTEM AND APPARATUS FOR SELECTIVELY SHUTTING OFF LEAKAGE OF COMPRESSED AIR IN MARINE SEISMIC AIRGUN ARRAYS HAVING COMMON SUPPLY HOSES FOR MULTIPLE AIRGUNS

FIELD OF THE INVENTION

The present invention is in the field of marine seismic surveying using an array of airguns towed behind a survey ship. More particularly this invention relates to method, system and apparatus for selectively shutting off leakage of compressed air in marine seismic airgun arrays wherein a common high pressure supply hose is used for supplying multiple airguns. The method, system and apparatus enable selectively shutting off compressed air flow to stop loss of air pressure in a common high pressure hose line caused by leakage from a leaking component for example such as leakage from an airgun feeder airhose which is ruptured or leakage from an airgun which has not fully closed after firing. Thus, after the leak is selectively shut off, the air pressure in the common supply hose rises back up to its normal working level and seismic surveying can proceed with minimal delay.

BACKGROUND

In marine seismic surveying as currently performed, a long array of airguns may contain forty or fifty or more airguns towed by a ship with an umbilical extending back from the ship along the length of the long array.

In such a towed array, it would be desirable (from the viewpoint of individual airgun control) to provide individual high-pressure hoselines extending back from the ship for feeding compressed air to respective individual airguns. Then, the ship could be equipped with an onboard shutoff valve for each individual hoseline. In the event of compressed air leakage due to rupture of a particular hoseline or due to non-closure of a particular airgun after firing, the onboard shutoff valve for the leaking hoseline could be closed. A computer program being used for assembling seismic data resulting from operating the array could be adjusted to account for a non-operating airgun in the array. Then surveying could proceed with minimal delay.

As a practical matter, when using such a large number of airguns in a towed array, it is not feasible to provide a multiplicity of individual high-pressure airhoses extending back from the ship to a multiplicity of individual airguns. Attempting to bundle such a large number of individual airhoses into an umbilical for a towed array would create an unduly bulky, large diameter, unwieldy umbilical. Such a bulky, heavy umbilical would be difficult to launch and to retrieve. Also, its relatively large diameter would cause increased towing stresses and more fuel consumption for the ship, due to undesirably large frictional drag resulting from a large-diameter umbilical being towed through the water.

Consequently, the umbilical is constructed with relatively few main high-pressure hoselines, each serving as a common air line for supplying numerous airguns. In many cases, only one common main high-pressure supply line is included in the umbilical depending on configuration of an array or of a sub-array. Connected to the common hoseline(s) at spaced intervals are smaller-diameter branch hoselines which extend from the common line to respective individual airguns or to airgun clusters.

With the use of a common airline, the occurrence of a non-closing airgun or a ruptured feeder line allows large volumes of compressed air continuously to escape from the common airline into a surrounding body of water. Such continual loss of compressed air from a common line is detrimental to or completely disrupts a seismic surveying operation due to loss of air pressure in the common line. Other airguns cannot operate properly with significantly reduced pressure in the common airline. Consequently the survey must stop until repairs are made to staunch the leak. The ship is stopped, and the airgun array is hauled on board for making the needed repairs. Such a stop for repairs in the midst of a marine seismic survey is wasteful of valuable time and may even curtail operations if the stop for repairs happens to occur during a "window of opportunity" when local weather conditions at sea may briefly be favorable for conducting the survey. Moreover, such loss of time is costly to a projected budget.

SUMMARY

A method embodying the present invention is provided for selectively shutting off leakage of compressed air in a marine seismic airgun array having a common high pressure airline supplying compressed air to a plurality of airguns. The method includes the steps of interposing individual shutoff valves between respective individual airguns and the common airline so that the common airline is upstream from each valve and an airgun is downstream from each valve. Closed and open conditions are provided for each valve wherein an open condition of the valve allows flow of compressed air from the common airline to the downstream airgun and a closed condition of the valve prevents flow of compressed air from the common airline to the downstream airgun. A spring force is provided for each valve. The spring force is selected to be capable of changing the valve from closed to open condition when air pressures downstream and upstream of the closed valve are equalized but to be incapable of changing the valve from closed to open condition when air pressures downstream and upstream of the closed valve are unequalized because air leakage is occurring downstream of the closed valve. For changing all valves simultaneously from open to closed conditions, electromagnetic forces are simultaneously provided for all valves. Then, after all valves are in closed condition, the electromagnetic forces for all valves are discontinued, whereby the spring force of each closed valve whose air pressures downstream and upstream of the closed valve are equalized is capable of changing the closed valve from closed to open condition, except for a closed valve whose downstream and upstream air pressures are unequalized because air leakage is occurring downstream of the closed valve.

In a method as described above in accord with a further embodiment of the invention, the firing of airguns is ceased for at least one firing cycle for allowing air pressures downstream and upstream of valves to become equalized prior to simultaneously providing the electromagnetic forces for all valves for changing all valves from open to closed condition, whereby the spring force of each closed valve is capable of changing the valve from closed to open condition, except for a closed valve whose downstream and upstream air pressures remain unequalized due to air leakage occurring downstream of the closed valve.

In a method as described, in accordance with another embodiment of the invention, subsequent to simultaneously discontinuing the electromagnetic forces, compressed air pressure in the common airline is backed down for bringing down the common airline pressure to a level below normal static working pressure for reducing air pressures upstream of all closed valves for assuring that the spring forces will change all valves from closed to open condition, except for a closed valve which remains in closed condition because its spring force is incapable of changing the closed valve from closed to open condition because its downstream air pressure is unequalized with the reduced air pressure upstream of the closed valve due to air leakage occurring downstream of the valve which remains closed.

A system embodying the present invention is provided for selectively shutting off leakage of compressed air in a marine seismic airgun array having a common high pressure airline supplying compressed air to a plurality of airguns. In the system a shutoff valve is connected between the common airline and each airgun so that the common airline is upstream from each valve and an airgun is downstream from each valve. Each valve has an open and a closed condition wherein an open condition allows flow of compressed air from the common airline through the valve to the downstream airgun and a closed condition prevents flow of compressed air from the common airline through the valve to the downstream airgun. Each valve has spring means for providing a spring force in each valve. The spring force is selected to be capable of changing the valve from closed to open condition when air pressures downstream and upstream of the closed valve are equalized but incapable of changing the valve from closed to open condition when air pressures downstream and upstream of the closed valve are unequalized by an amount indicative of air leakage occurring downstream of the closed valve. Each valve has electromagnetic means for changing the valve from open to closed condition during electrical energization of the electromagnetic means. The system includes electrical energization means for simultaneously energizing the electromagnetic means of all valves for simultaneously changing all valves from open to closed condition and then, after all valves are in closed condition, for deenergizing the electromagnetic means of all valves, whereby the spring force of each closed valve is capable of changing the closed valve from closed to open condition when air pressures downstream and upstream of the closed valve are equalized, except for a closed valve whose downstream and upstream air pressures are unequalized resulting from air leakage occurring downstream of the closed valve.

In a system as described in accord with a further embodiment of the invention each valve has a bleed path for allowing compressed air to bleed from upstream of the valve to downstream of the valve for enabling downstream and upstream air pressures of all valves in closed condition during non-firing of airguns to become equalized, except for a closed valve whose downstream and upstream air pressures remain unequalized because air leakage is occurring downstream of the closed valve.

A shutoff valve embodying the invention is described for use in a marine seismic airgun array. The valve includes openable and closeable valve means for allowing compressed air to flow from upstream to downstream of the valve when the valve means are open and for preventing compressed air to flow from upstream to downstream of the valve when the valve means are closed. The valve also includes spring biasing means normally maintaining the valve means open. The spring biasing means are selected to provide spring force such that (1) when air pressures downstream of the closed valve means are equalized with air pressures upstream of the closed valve means, the spring force is capable of opening the valve means after the valve means have been closed and such that (2) when air pressures downstream of the closed valve means are unequalized with air pressures upstream of the closed valve means resulting from air leakage occurring downstream of the closed valve means, the spring force is incapable of opening the closed valve means. The valve also includes electromagnetic means for overcoming the spring biasing means for closing the valve means during electrical energization of the electromagnetic means, whereby the valve means can be closed by electrical energization of the electromagnetic means and will open upon deenergization of the electromagnetic means when air pressures downstream and upstream of the closed valve are equalized but the valve means will remain closed when the downstream air pressure is unequalized with the upstream air pressure resulting from air leakage occurring downstream of the closed valve means.

As used herein the terms "compressed air", "high pressure air" and "air" are intended to be interpreted broadly to include any gaseous fluid which is suitable for use in a marine seismic airgun array.

As used herein the terms "air leakage" and "leakage" do not mean an intentional bleeding of air. These terms "air leakage" and "leakage" mean a non-intentional abnormal continuous escape of compressed air which arises during a seismic surveying operation and is of such serious nature as to be detrimental to or disruptive of the operation, for example as caused by an airgun feeder airline which becomes stress-fatigued and suddenly ruptures or as caused by an airgun which has been firing properly for many repetitive firing cycles and then suddenly fails to reclose after firing and remains non-closed.

As used herein the term "equalized" as applied to air pressure downstream and upstream of a closed shutoff valve embodying the invention does not necessarily mean that these air pressures are exactly equal. The term "equalized" as applied to air pressures downstream and upstream of a closed shutoff valve embodying the invention means that these air pressures are sufficiently close to each other (or that air pressures downstream and upstream of the closed shutoff valve are able to be brought sufficiently close to each other by intentionally reducing air pressure upstream of the closed shutoff valve, or that air pressures downstream and upstream of the closed shutoff valve are able to be brought sufficiently close to each other by intentionally bleeding compressed air from upstream to downstream of the closed shutoff valve) as to indicate that normal air handling conditions are occurring downstream of the closed shutoff valve.

Conversely, the term "unequalized" as applied to air pressures downstream and upstream of a closed shutoff valve embodying the invention means that these air pressures differ by an amount (or that after intentionally reducing air pressure upstream of the closed shutoff valve the air pressures downstream and upstream of the closed shutoff valve differ by an amount, or that after intentionally bleeding compressed air from the upstream to downstream of the closed shutoff valve the air pressures downstream and upstream of the closed shutoff valve differ by an amount) indicative of and resulting from air leakage occurring downstream of the closed shutoff valve.

BRIEF DESCRIPTION OF THE DRAWINGS

The invention, together with further objects, features, advantages and aspects thereof, will be more clearly understood from the following detailed description considered in conjunction with the accompanying drawings. Like reference numerals indicate like elements or like components throughout the different views.

The accompanying drawings, which are incorporated in and constitute a part of the specification, illustrate presently preferred embodiments of the invention in method, system and apparatus and, together with the general description set forth above and the detailed description of the preferred embodiments set forth below, serve to explain the principles of the invention. In these drawings:

As shown in FIG. 1, a cluster of three airguns are suspended from a towing bar which itself is suspended from a towing plate. Mounted on each towing plate are shown three shutoff valves with each valve being arranged for shutting off air flow to its respective hoseline leading to one of the three airguns. Air flow is enabled to be shut off if air leakage occurs in an airgun itself or in an individual air supply hoseline or in any other component downstream of a shutoff valve.

As seen in FIGS. 1, 2 and 3, the shutoff valves are mounted on this adapter block.

FIG. 7 is an enlarged partial elevational sectional view for purposes of explanation and corresponds with a portion of FIG. 3, except that FIG. 7 shows a closed condition of the shutoff valve, while FIG. 3 shows an open condition.

DETAILED DESCRIPTION OF PREFERRED EMBODIMENT

Figure 1:
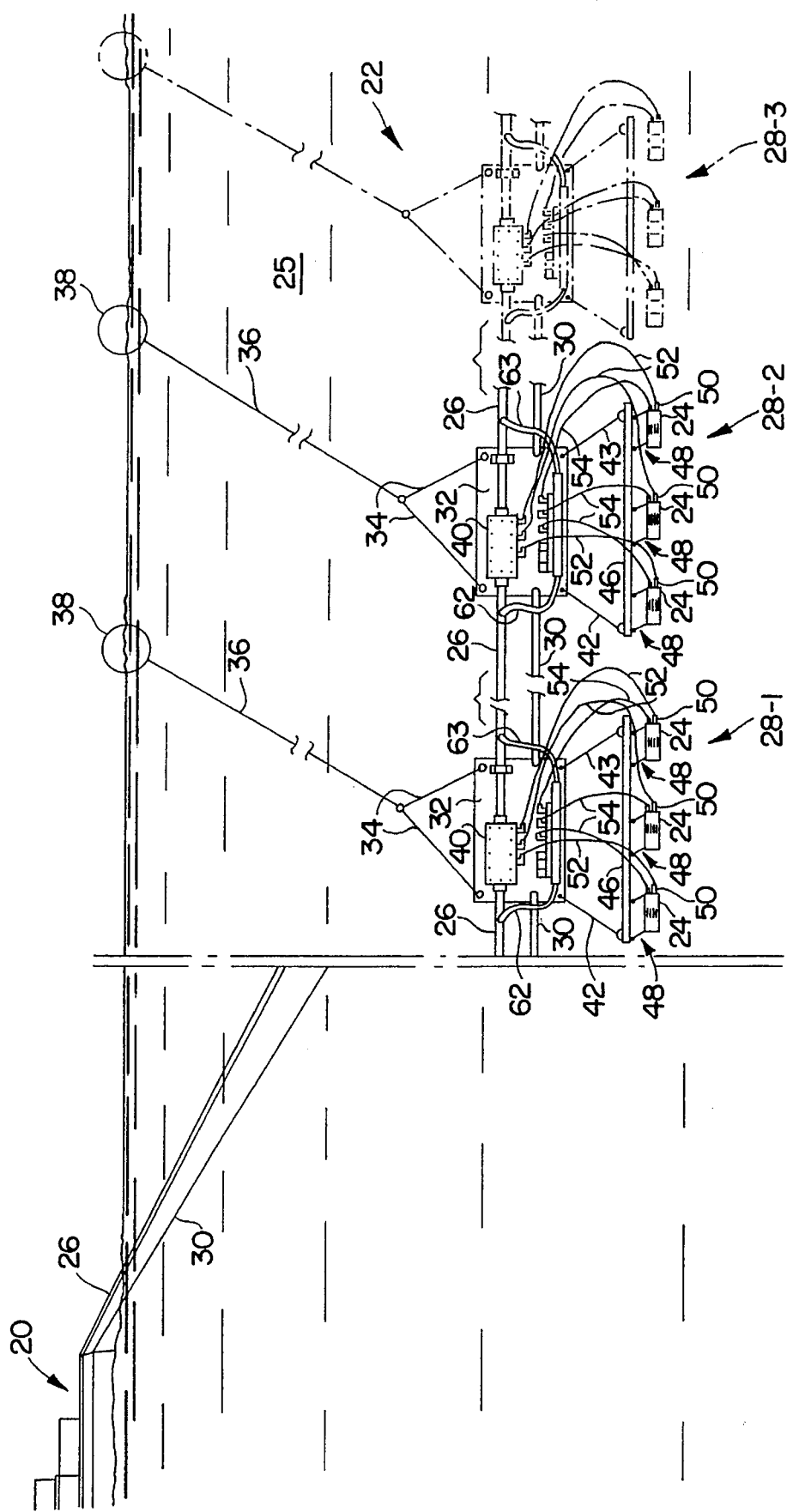
FIG. 1 shows an array of marine seismic airguns towed through a body of water by a survey vessel. This array includes shutoff valves embodying the invention for shutting off high pressure air flow to prevent leakage from any downstream component causing leakage.

As shown in FIG. 1 a seismic survey vessel 20 tows an array 22 of airguns 24 through a body of water 25. An umbilical 26 includes various electrical lines including control lines for firing the airguns and may include signal lines for carrying electrical signals to the ship 20 from a hydrophone 27 (FIG. 2) and from a depth sensor 29. Also, the umbilical 26 includes a common main high pressure hose line (not shown) for supplying high pressure gaseous fluid, usually compressed air, in common to all of the multiple airguns 24 in the array 22. For example, this high pressure compressed air often is within an operating pressure range from about 1,800 to about 2,400 pounds per square inch (psi), and higher or lower pressures may be used. A protective sheath may surround the umbilical 26. Also included in this umbilical are a pair of wires 31 (FIG. 6) for selectively shutting off compressed air flow to any leaking component of the array 22, as will be explained below in detail. The umbilical 26 may include signal wires for carrying data to and from the ship for other sensors or control elements, as may be desired.

Although this marine seismic array 22 is shown being fed by a single common high pressure hose line in the umbilical 26 for supplying all of the airguns 24, it will be understood that more than one main high pressure line may be used, each of which serves as a common line for supplying compressed air to a plurality of airguns. For example, a plurality of high pressure hose lines may be employed, with each line supplying a plurality of airguns in a respective cluster 28-1, 28-2, 28-3, etc.

It is among the advantages resulting from using this invention that air flow to any individual airgun, airline or component experiencing air leakage can be shut off selectively even though it previously was being supplied with high pressure compressed air in common with other airguns.

The array 22 is shown being towed by a stranded steel wire towing cable 30, often called a stress member. This stress member 30 may be incorporated into the umbilical 26, or the umbilical may include one or more stress members for itself in addition to the towing cable 30.

A plurality of towing plates 32 (FIGS. 1 and 2) are shown in the array 22, each plate being suspended by a pair of bridle lines 34 joined to a rigging line 36 extending up to a float 38. These bridle and rigging lines 34 and 36 may be stranded steel wire cables as shown or may be chains. The umbilical 26 is shown secured by clamps 39 (FIG. 2) to each towing plate 32 and connected to a waterproof box 40 (FIG. 1) mounted on each towing plate and indicated in dashed outline 40 in FIG. 2. This waterproof box may contain electronic equipment involved in firing the airguns and in monitoring their performance and contains electrical connections for the firing lines and for the pair of electrical lines for the shutoff valves.

To support the cluster of airguns 28-1, 28-2, 28-3, etc. below the respective towing plates 32, there are rigging cables or chains 42 and 43 connected to fore and aft ends 44 and 45 (FIG. 2) of the towing plate. These rigging lines 42, 43 are shown suspending ends of a towing bar 46. A towing line (not shown) may be connected to the front end of each towing bar for preventing the bar from jittering sideways. Three airguns 24 are shown suspended from each towing bar by pairs of rigging cables or chains 48. Each airgun 24 has a solenoid valve 50 mounted thereon for firing as is known in the art. An electrical firing line 52 is shown extending from the waterproof box 40 to each solenoid valve 50. High pressure air supply hose lines 54 are shown connected from outlet fittings 56 on a valve adapter block 58 welded to a high pressure air supply manifold tube 60. A hose airline 54 extends from a respective outlet 56 to each airgun 24 for feeding compressed air to the respective airgun as explained in detail below.

In order to feed high pressure air indicated by arrows 61 (FIGS. 2 and 3) into and through the manifold tube 60, a branch high pressure hose line 62 (FIG. 1) may extend from the common main high pressure hose line in the umbilical 26. This branch hose airline 62 is shown connected to an inlet fitting 64 on a forward end of the manifold tube with a return portion 63 of this branch hose airline extending from an outlet fitting 66 on an aft end of the manifold tube back to the umbilical. Thus, the bore 68 of manifold tube 60 is supplied with compressed air 61 and is serving as a common source for supplying three airguns in a respective cluster 28-1, 28-2 or 28-3. The return portion 63 of the branch line may be omitted.

Figure 2:
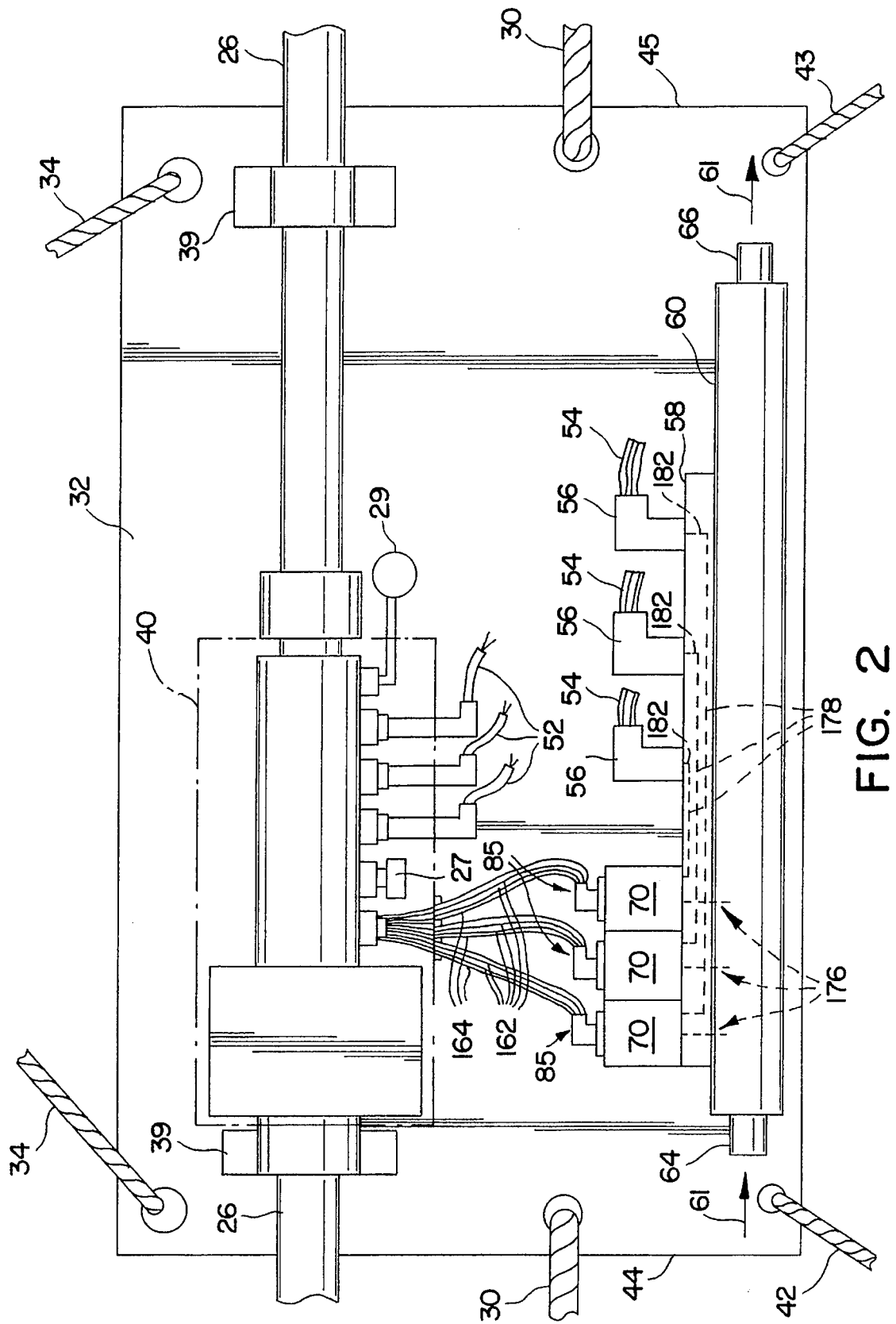
FIG. 2 is a side elevational view of one of the towing plates seen in the array in FIG. 1.

Shutoff valves 70 are provided to shut off leakage of air occurring downstream of the valve, for example if air leakage occurs in an airgun 24 or in an individual hose 54 or in any other component located downstream of the valve. Three shutoff valves 70 are shown in FIG. 2. They are mounted as shown in FIG. 3 on the valve adapter block 58 by hold-down bolts (not shown) passed through bolt holes 72 (FIGS. 3 and 4) and screwed into threaded sockets 74 in the valve adapter block 58.

Figure 3:
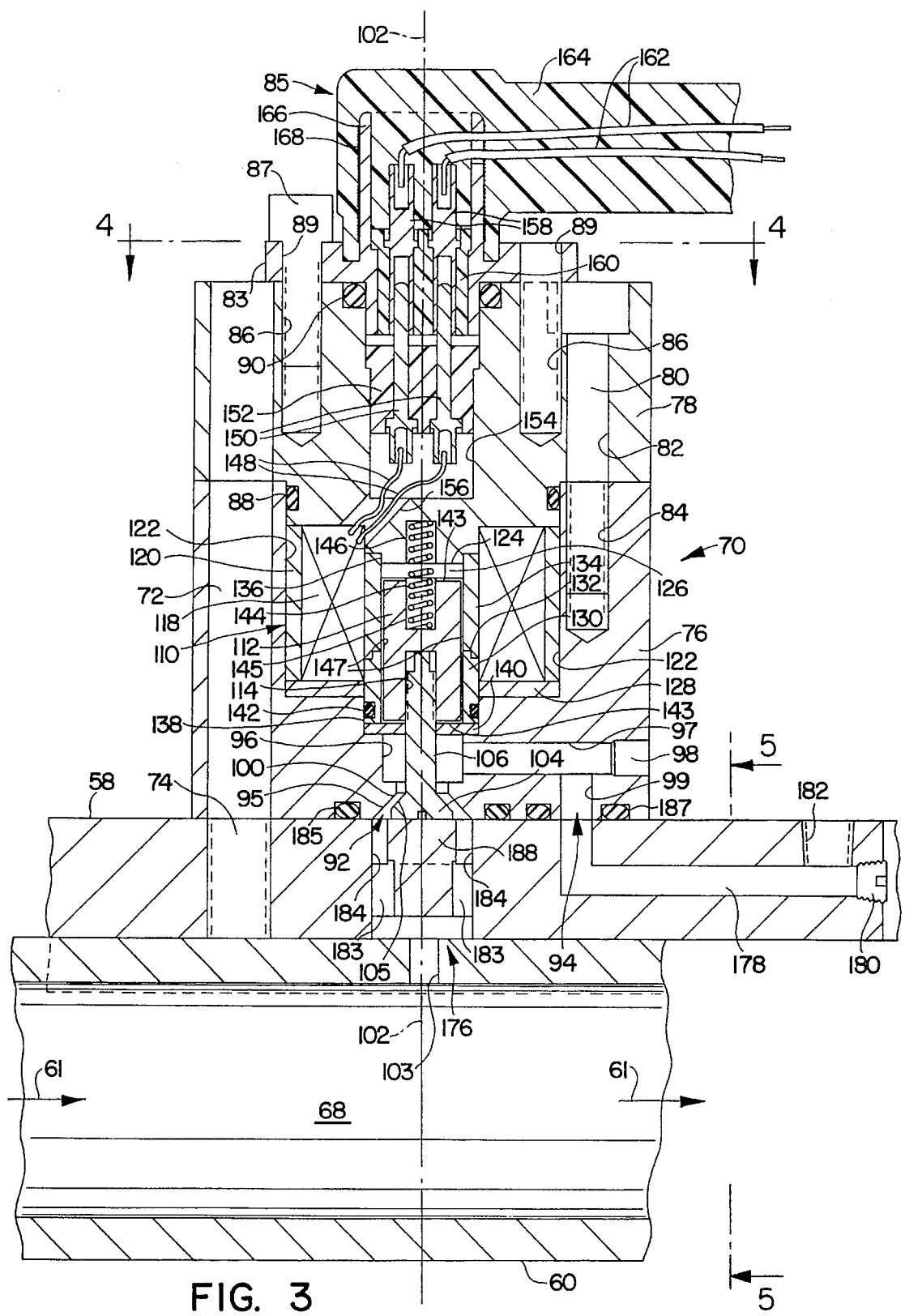
FIG. 3 is an enlarged elevational sectional view taken along an irregular line 3—3 in FIG. 4 showing one of the air supply shutoff valves together with its streamlined electrical connector.
Figure 4:
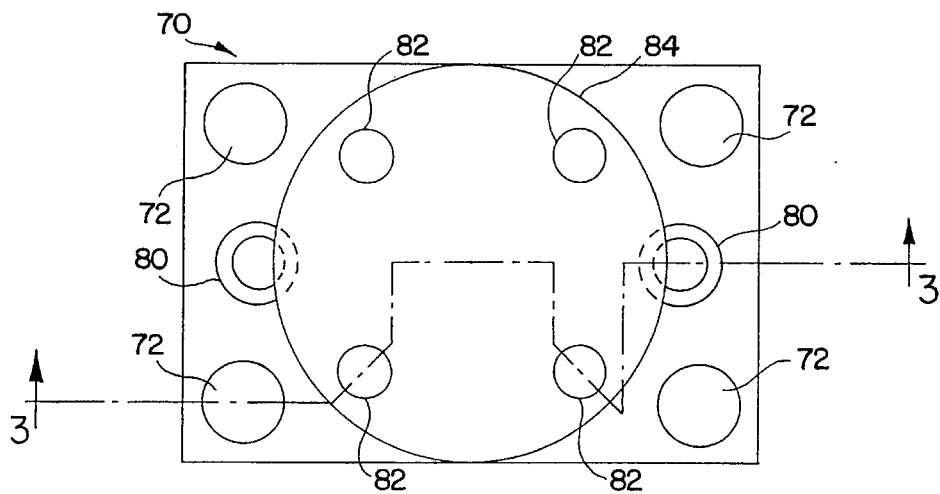
FIG. 4 is a partial top view taken along the plane 4—4 in FIG. 3 showing the top plan configuration of the shut-off valve, with electrical connector elements being omitted from FIG. 4 for clarity of illustration.
Figure 5:
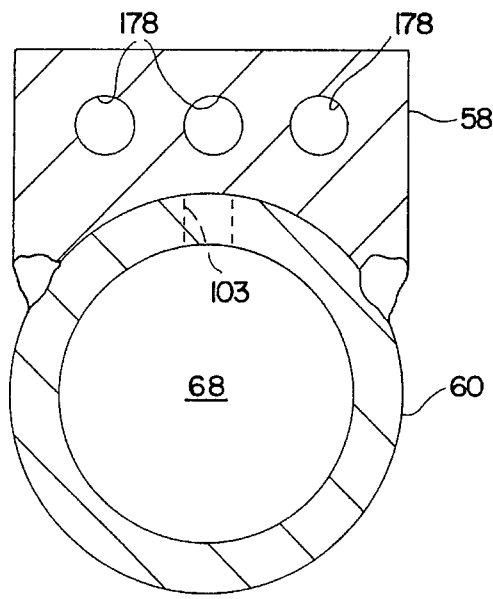
FIG. 5 is a cross sectional view taken along the plane 5—5 in FIG. 3 showing an air tube manifold with a valve adapter block welded onto the manifold.

The shutoff valve 70 has a housing including a housing base portion 76 and a housing top portion 78 removably secured to the base by two valve assembly bolts 80 (only one is seen in FIG. 3) passed through bolt holes 82 in the top and screwed into threaded sockets 84 in the base. A streamlined electrical connector 85 is mounted onto the housing top 78 by four mounting bolts 87 (only one is seen in FIG. 3) fitted through holes 89 in a flange of a connector mounting head 83 and screwed into threaded sockets 86 in the housing top 78. The connector head 83 as shown is formed of non-magnetic stainless steel. O-rings 88 and 90 of suitable resilient material as known in the art are shown to provide fluid-tight seals respectively between housing base and top 76, 78 and between housing top and connector mounting head 78, 83.

The valve 70 is shown having an annular inlet 92 and an outlet 94. The valve has passage means configured as shown at 95, 96, 97, 98 and 99 enabling communication in a downstream flow direction from the inlet to the outlet. The passage means 95 include a truncated conical valve seat 100 whose inwardly facing seat surface converges in a downstream direction at an angle of about 45° relative to a longitudinal central axis 102 of the valve. The passage means 95 and valve seat 100 are concentric with valve axis 102. Passage means 96 is a chamber downstream from valve seat 100. Passage means 97 is formed by a borehole whose outer end is blocked by a screwed-in plug 98 and whose inner end connects with the chamber 96. The outlet 99 connects with an outlet borehole 97. A drilled port 103 in the valve adapter block supplies compressed air from manifold bore 58 to an air deflector described later.

An axially movable valve member 104 concentric with axis 102 has a truncated conical valve surface 105. This outwardly facing seatable surface 105 converges in a downstream direction at an angle of about 45° with the axis 102. The valve member has an integral stem element 106 extending along the axis and passing through chamber 96 and being mechanically connected to electromagnetic operating means 110. The one-piece valve member and stem 104, 106 is formed of non-magnetic stainless steel.

The electromagnetic operating means 110 include an axially movable cylindrical armature 112 formed of ferromagnetic stainless steel and having a threaded socket 114 into which is screwed a threaded end of the valve stem 106. A screw driver slot 116 (FIG. 7) may be provided in an upstream working surface of valve member 104 for use in turning the stem 106 tightly into its threaded socket 114. The electromagnetic means 110 also include a solenoid winding 118 sheathed in a circular cylindrical casing sleeve 120 formed of ferromagnetic stainless steel. The winding 118 with its ferromagnetic sleeve 120 are removably fitted into a circular cylindrical recess 122 in the housing base 76 and are held in place in this recess by the housing top 78. The housing base 76 is formed of non-magnetic stainless steel, but the housing top 78 is formed of ferromagnetic stainless steel for providing a ferromagnetic pole 124 spaced by an air gap 126 from a top end of the armature 112. Since it is formed of ferromagnetic material, the housing top 78 provides a low-reluctance magnetic flux path between the ferromagnetic casing sleeve 120 and the pole 124. The winding has an annular casing end 128 formed of ferromagnetic stainless steel encircling a cylindrical pole element 130 formed of ferromagnetic stainless steel which encircles a lower portion of the movable armature 112. Since they are formed of ferromagnetic material, the casing end 128 and cylindrical pole element 130 provide a low-reluctance magnetic flux path between the ferromagnetic casing sleeve 120 and the lower portion of the armature 112. In summary, a low-reluctance flux path may have a configuration as shown for carrying magnetic flux produced by electrical energization of the winding 118. This present flux path arrangement can be traced starting from the pole 124 at the top of air gap 126 through housing top 78, through casing sleeve 120, through casing end 128, through cylindrical pole element 130 and into and through armature 112 to the bottom of the air gap.

The cylindrical pole element 130 is shown fixed by a permanent welded or brazed annular stepped joint 132 to a sleeve 134 formed of non-magnetic stainless steel. This non-magnetic sleeve 134 is shown secured in fixed relationship to the housing to 78 by a permanent welded or brazed annular stepped joint 136 encircling the pole 124. The cylindrical pole element 130 is shown extending below the casing end 128 to be received in a cylindrical recess 138 with a washer 140 of bronze shown in the recess below the cylindrical pole element. An O-ring 142 of suitable resilient material known in the art provides a fluid-tight seal between the cylindrical pole element 130 and the housing base 76.

The bronze washer 140 serves to guide the stem element 106 in its axial movement and also serves as a barrier wall for protecting the end of the armatures 112 facing the chamber 96. It is to be noted that compressed air flowing through the inlet 92 into the chamber 96 has a component of motion toward the armature 112. If the barrier wall 140 were not provided, compressed air flow entering the chamber 96 might impinge against the end of the armature 112 with its momentum inadvertently moving the valve member 104 into closed position against the valve seat 100.

In order to prevent air from becoming trapped in (or excluded from) the airspace 126 between the armature 112 and pole 124, such that trapped or excluded air would impede axial travel of the armature, there are small grooves 143 extending diametrically across each end of the armature. These grooves 143 communicate with a pair of narrow flats 147 extending axially along the full length of the armature. These two narrow flats 147 are located in diametrically opposite positions on the armature, and they interrupt the otherwise circular cylindrical exterior surface of the armature.

In order to provide spring bias force "f" (FIG. 7) for urging the valve member 104 in a first direction toward an open position spaced away from the valve seat 100 as shown in FIG. 3. a corrosion-resistant compression spring 144 is provided. As shown this spring may be concentric with axis 102 and may be received in axial recesses 145, 146 in the armature and pole, respectively.

Figure 7:
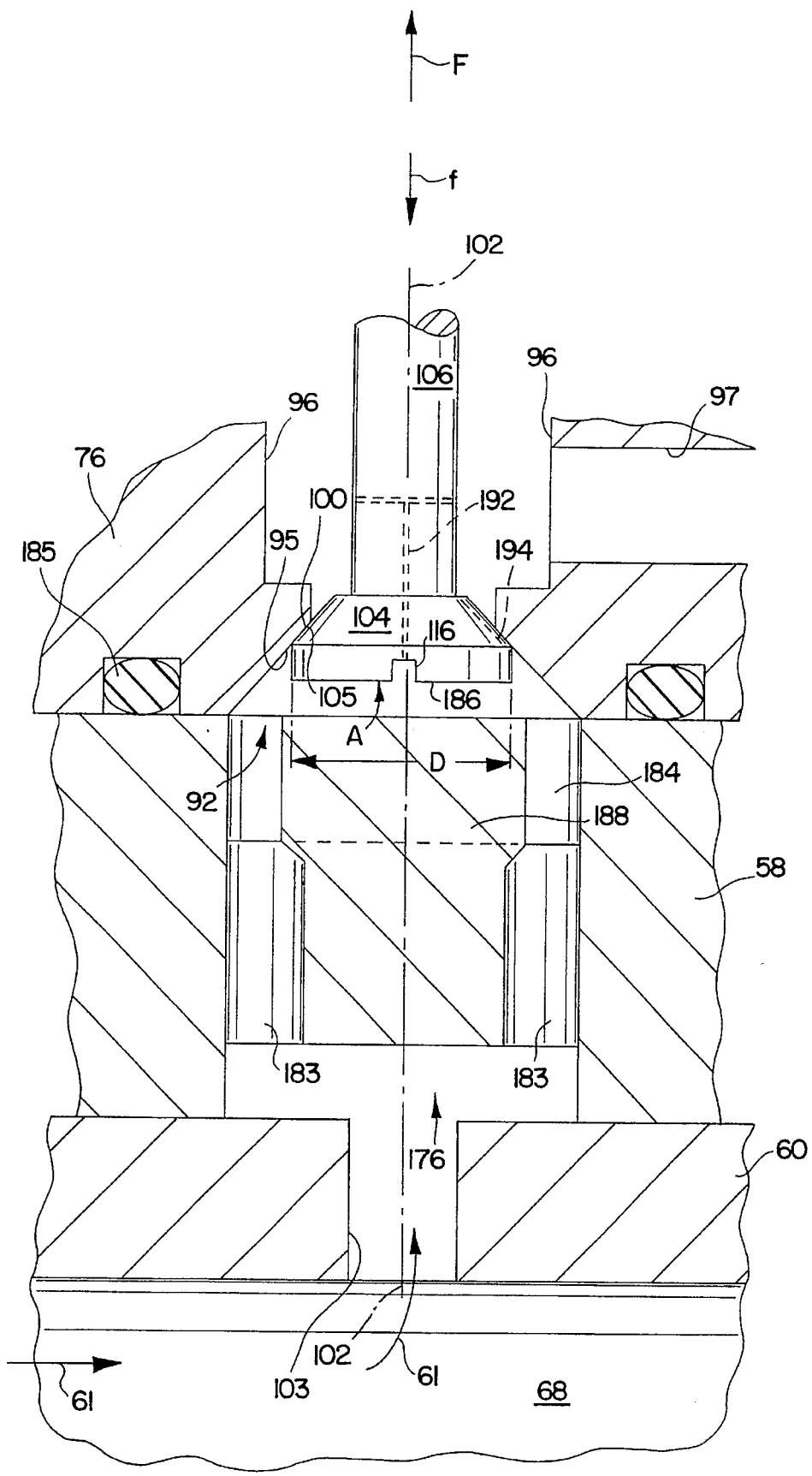

In order to provide electromagnetic force "F" for overcoming the spring bias force "f", for urging the valve member 104 in a second direction (opposite to the first direction) to a closed position as shown in FIG. 7 in which valve member surface 105 is seated in fluid-tight relationship against the valve seat 100, the winding 118 is electrically energized for electromagnetically attracting the armature 112 toward the pole 124, thereby providing electromagnetic force "F" exceeding spring force "f".

The winding 118 is shown having two leads 148 connected to a pair of terminals shown as contact pins 150 held in position by an insulative mount 152 in a terminal socket 154 in the housing top 78. The leads 148 are shown extending from the winding 118 through a passage 156 communicating with the terminal socket. The leads 148 and lower ends of the contact pins 150 are encapsulated within insulating material in socket 154 and in passage 156 as known in the art. This encapsulating material is not shown for improving clarity of illustration.

The streamlined electrical connector 85 has a pair of contact socket pins 158 held in position by an insulative mount 160 in the connector mounting head 83. A pair of insulated electrical conductors 162 are connected to the two contact socket pins and are encased within a streamlined sheath 164 formed, for example, of stiffly flexible molded polyurethane. The mounting head 83 has a top portion 166 which is suitably externally roughened at 168 for increasing the bonding of the sheath 164 to this top portion of the mounting head 84. For example, this external roughening is shown as a multi-turn fine screw thread around the top portion 166.

Figure 6:
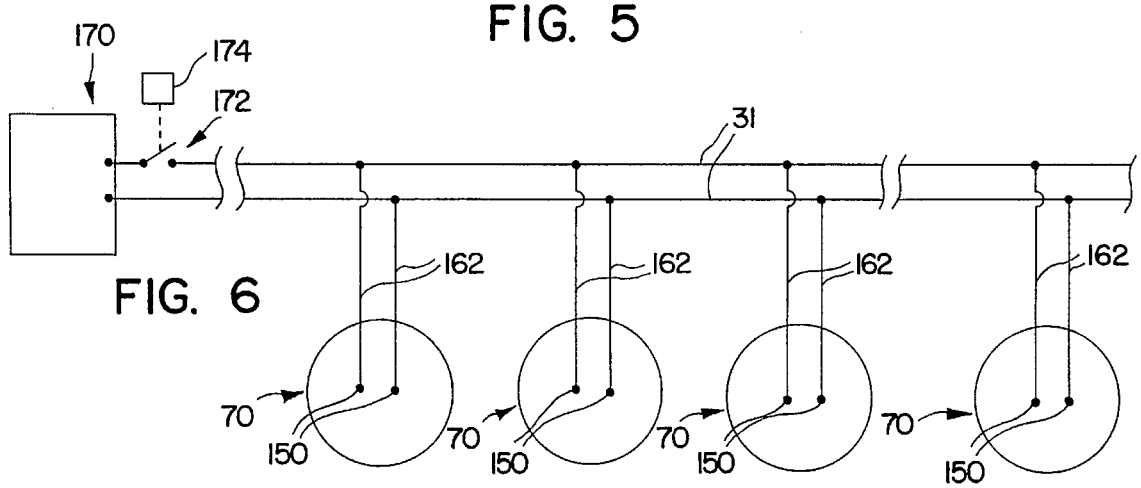
FIG. 6 is a schematic circuit diagram illustrating a plurality of shut-off valves in parallel electrical connection to two wires in the umbilical. The umbilical wires are connected to electrical energization means on shipboard for controlling all shutoff valves in the array.

As shown in FIG. 2, the respective conductor pairs 162 in their protective sheaths 164 extend from their streamlined connectors 85 up to the waterproof box 40 wherein they are connected as shown in FIG. 6 to the pair of wires 31 in the umbilical 26.

In this example as shown in FIG. 3, the solenoid winding 118 may include about 975 turns to about 1,000 turns of size No. 28 American Wire Gage copper magnet wire. The corrosion resistant compression spring 144 may be formed of stainless steel spring wire having a wire diameter of about 0.026 of an inch wound in a helix having an outside diameter of about 0.18 of an inch. With the valve in open position (FIG. 3) the spring force is about 2.6±0.5 pounds. With the valve in closed position (FIG. 7) the spring force is about 4.1±0.9 pounds. The travel of the valve member 104 from full open to full closed as shown is about 1/16th of an inch.

On shipboard there is a source 170 of controllable electrical power suitable for simultaneously energizing and for simultaneously deenergizing all of the solenoid windings 118 connected to the wires 31. For example, the source 170 provides direct current having a terminal voltage preferably in a range from about 100 volts to about 300 volts. Switch means 172 and a switching control 174 provide a relatively brief pulse of direct current electrical energization, for example having a time duration in a range of about 30 milliseconds to about 250 milliseconds or somewhat longer. A minimum pulse duration of about 10 to 20 milliseconds may be sufficient to close some or all of the valves. However, this pulse of direct current needs to be of sufficient duration, preferably in a range from at least about 30 milliseconds up to about 100 milliseconds or more depending upon voltage used and number of shutoff valves which are connected in parallel, for assuring that all of the shutoff valves become closed. This pulse should not continue for so long as to cause overheating of the windings 118. Experimental tests have shown that a voltage somewhat less than 100 volts down to about 50 volts may be used with a pulse duration of at least about 30 milliseconds, but it is preferred to use a voltage in the range of about 100 volts to about 300 volts as originally stated.

When the shutoff valves 70 are open, compressed air 61 (FIG. 3) can flow from manifold bore 68 through port 103 and then through air deflector passages 176 (FIGS. 2 and 3) to the inlet 92 of each valve. From the outlets 94 of the respective valves compressed air can flow through respective individual downstream supply passages 178 in the valve adapter block 58. These downstream supply passages 178 communicate with respective individual outlet fittings 56 (FIG. 2). For example, these passages 178 may be drilled in the adapter block 58 with a screwed-in plug 180 at the end of each passage and with a threaded port 182 to which is connected a respective outlet fitting 56.

Each of the air deflector passages 176 in the valve adapter block 58 includes a plurality of drilled holes 183 leading into an annular passage 184 which is concentric with axis 102 and is aligned with the annular inlet 92. For example, there are eight drilled holes 183 uniformly spaced around the axis 102. The annular passage 184 is spaced radially sufficiently far from the axis so that compressed air flowing through this annular passage when the valve member 104 is in open position (FIG. 3) does not impact directly against an upstream working surface 186 (FIG. 7) of the valve member. Thus, an undrilled portion 188 of the adapter block which is located on the axis 102 in front of the working surface 186 serves as an air deflector positioned upstream of this working surface 186 for deflecting away from this working surface down-stream-rushing compressed air. Consequently, downstream-rushing compressed air is caused to bypass the perimeter of the valve member 104 so that this incoming air does not impact against the upstream working surface 186 of the valve member, thereby preventing downstream-rushing compressed air from inadvertently pushing the valve member 104 into closed position. O-rings 185 and 187 positioned around inlet 92 and outlet 94 seal the valve 70 to the valve adapter block 58.

If desired for assuring that closed valves not experiencing downstream air leakage will have sufficient downstream air pressure available for aiding spring force in opening the valve, a small bleed path may be provided from upstream to downstream of a closed valve, thereby allowing compressed air to bleed from upstream to downstream of a closed valve for raising air pressure downstream of the valve after it has been closed. For example, as shown in FIG. 7 a small bleed passage 192 shown by a dotted line may be drilled through the valve member 104 from the screw driver slot in the upstream working surface 186 and leading into a cross drilled passage leading into the downstream chamber 96. Alternatively a small bleed groove 194 shown by a dotted line may be formed along the seatable surface 105.

In order selectively to remain closed for shutting off compressed air flow into any downstream airline 54 (FIG. 2) experiencing air leakage while not remaining closed for any downstream airline experiencing normal air handling conditions, it is critical that the compression spring 144 be selected to provide spring bias force "f" such that (1) when air pressures downstream of the closed valve means 100, 104, 105 (FIG. 7) are equalized with air pressures upstream of the closed valve means, the spring force "f" is capable of overcoming valve friction for opening the valve means after the valve means have been closed, and such than (2) when air pressures downstream of the closed valve means are unequalized with air pressures upstream of the closed valve means resulting from air leakage occurring downstream of the closed valve means, the spring force "f" is incapable of opening the closed valve means.

It is preferred for fuel efficiency and minimum consumption of time that (3) the spring force "f" be capable of opening the valve means when air pressures upstream and downstream of the closed valve means are equalized and air pressures upstream of the closed valve means are in a normal operating range. This preferred situation is not a necessary situation, since the upstream air pressure can be reduced by shipboard personnel backing down the pressure in a common main line such that upstream and downstream air pressures become equalized at a pressure level reduced below a normal operating range at which reduced pressure level the spring force "f" is capable of opening the closed valve means.

For example, the circular upstream working surface 186 (FIG. 7) of the valve member as shown has a diameter "D" of about ⅜ of an inch (about 0.375"). The conical slopes of seat 100 and seatable surface 105 are preferred to be arranged so that a line of contact between valve member 104 and seat occurs near the perimeter of the valve member at its diameter of about 0.375 of an inch. In other words, when the valve member is closed, its upstream working surface 186 has an effective diameter of about 0.375 of an inch, thereby providing an area "A" of about 0.11 of a square inch. With the valve closed, the opening force "f" is about 4.1±0.9 pounds as previously explained. An upstream air pressure acting against surface area "A" which exceeds a downstream air pressure by a difference that is slightly more than ΔP is sufficient to hold the valve member closed:

$$\Delta P \text{ (in pounds per square inch)} \times A \text{ (in square inches)} = f \text{ (in pounds)} \quad (1)$$

$$\Delta P = \frac{f}{A} = \frac{4.1 - 0.9}{0.11} = \frac{3.2}{0.11} = 29 \text{ psi} \quad (2)$$

$$\Delta P = \frac{f}{A} = \frac{4.1 + 0.9}{0.11} = \frac{5}{0.11} = 45 \text{ psi} \quad (3)$$

Consequently, in this example an upstream air pressure which exceeds a downstream air pressure by at least about 50 psi is unequalized sufficiently by enough pressure difference to hold the valve member closed.

When the upstream and downstream air pressures are equalized at a normal operating pressure level of about 2,000 psi, the spring force f of at least about 3.2 pounds in this example is sufficient to overcome valve friction to push the valve member 104 to its open position.

Since other changes and modifications varied to fit particular operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A method for selectively shutting off leakage of compressed air in a marine seismic airgun array having a common high pressure airline supplying compressed air to a multiplicity of airguns and wherein individual airguns are supplied from the common airline, said method comprising the steps of:

interposing individual shutoff valves between respective individual airguns and the common airline, thereby having the common airline upstream from each valve and having an airgun downstream from each valve;

providing closed and open conditions for each valve, wherein an open condition of a valve allows flow of compressed air from the common airline to the downstream airgun and a closed condition of a valve prevents flow of compressed air from the common airline to downstream of a closed valve;

providing spring force for each valve;

selecting the spring force to be capable of changing the valve from closed condition to open condition when air pressures downstream and upstream of the valve are equalized and selecting the spring force for being incapable of changing the valve from closed condition to open condition when air pressures downstream and upstream of the valve are unequalized due to air leakage occurring downstream of the valve;

simultaneously providing electromagnetic forces for all valves for changing all valves from open to closed condition; and after all valves are in closed condition, simultaneously discontinuing the electromagnetic forces for all valves, whereby the spring force of each valve is capable of changing the valve from closed to open condition except for a valve whose downstream and upstream air pressures remain unequalized because air leakage is occurring downstream of the valve.

2. A method as claimed in claim 1, including the step of:

ceasing sending firing signals to all airguns for stopping firing of airguns prior to simultaneously providing the electromagnetic forces, whereby stopping firing of the airguns allows air pressures downstream and upstream of all valves to become equalized prior to changing all valves from open to closed condition, except for a valve whose downstream and upstream air pressures remain unequalized due to air leakage occurring downstream of the valve.

3. A method as claimed in claim 1, including the step of:

subsequent to simultaneously discontinuing the electromagnetic forces, backing down compressed air pressure in the common airline for bringing down the common airline pressure to a level below its normal static working pressure for reducing air pressures upstream of all closed valves for assuring that the spring forces will change all valves from closed to open condition, except for a valve which remains in closed condition because its spring force is incapable of changing the valve from closed to open condition because its downstream air pressure is below the reduced air pressure upstream of the valve due to air leakage occurring downstream of the valve which remains closed.

4. A method as claimed in claim 2, including the step of:

subsequent to simultaneously discontinuing the electromagnetic forces, backing down compressed air pressure in the common airline for bringing down the common airline pressure to a level below its normal static working pressure for reducing air pressures upstream of all closed valves for assuring that the spring forces will change all valves from closed to open condition, except for a valve which remains in closed condition because its spring force is incapable of changing the valve from closed to open condition because its downstream air pressure is below the reduced air pressure upstream of the valve due to air leakage occurring downstream of the valve which remains closed.

5. A method as claimed in claim 2, including the steps of:

providing bleeding of compressed air from upstream of each valve to downstream of each valve for causing downstream and upstream air pressures of all closed valves during non-firing of airguns to become equalized, except for a valve whose downstream and upstream air pressures remain unequalized because air leakage is occurring downstream of the airgun.

6. A system for selectively shutting off leakage of compressed air in a marine seismic airgun array having a common high pressure airline supplying compressed air to a plurality of airguns comprising:

a plurality of shutoff valves;

each shutoff valve being connected between the common airline and a respective individual airline with the common airline being upstream of each valve and an airgun downstream of the valve;

each valve being openable and closeable;

an open valve allowing flow of compressed air from the common airline through the valve to the downstream airgun and a closed valve preventing flow of compressed air from the common airline through the valve to downstream of the closed valve;

spring means in each valve providing a spring force for biasing the valve from closed to open;

said spring force being selected for being capable of opening a closed valve when air pressures upstream and downstream of the closed valve are equalized and for being incapable of opening a closed valve when air pressures upstream and downstream of the valve are unequalized by an amount indicative of an air leakage problem downstream of the valve;

electromagnetic means in each valve for overcoming the spring force for holding the valve closed during electrical energization of the electromagnetic means; and electrical energization means in the system for simultaneously energizing the electromagnetic means of all valves in the system for simultaneously closing and holding all valves closed during electrical energization of the electromagnetic means, whereby upon cessation of electrical energization of the electromagnetic means the spring force in each valve is capable of opening each valve whose upstream and downstream air pressures are equalized but the spring force in a valve is incapable of opening a closed valve whose upstream and downstream air pressures are unequalized by an amount indicative of an air leakage problem downstream of the valve.

7. A system as claimed in claim 6, in which:

each valve includes a bleed path for bleeding compressed air from upstream of the closed valve to downstream of the closed valve for enabling air pressures downstream of closed valves to become equalized with air pressures upstream of closed valves during non-firing of airguns, except for a closed valve whose air pressures downstream of the closed valve remain unequalized with air pressures upstream of the closed valve by an amount indicative of an air leakage problem downstream of the closed valve.

8. A system as claimed in claim 6, in which:

the common airline is connected to a manifold for supplying compressed air from the common airline into the manifold;

the plurality of shutoff valves are mounted to and are connected to said manifold for supplying compressed air from the manifold to said shutoff valves;

shutoff valves are respectively individually connected downstream to respective fittings; and said fittings are connectable through respective feeder airlines to respective airguns for feeding compressed air to the respective airguns.

9. A system as claimed in claim 8, in which:

the manifold, shutoff valves and fittings are mounted on a towed member in the array;

all of the respective airguns are supported by said towed member; and feeder airlines extend from respective fittings to the respective airguns.

10. A system as claimed in claim 8, further comprising:

a plurality of air deflectors;

respective ones of said air deflectors are included in respective air passages extending from the manifold to respective valves; and each air deflector configures compressed air flowing into an open shutoff valve for preventing the flowing compressed air from closing the open shutoff valve.

11. A shutoff valve for shutting off leakage of compressed air for use in a marine seismic airgun array having a common high pressure airline supplying compressed air to a plurality of airguns, said valve comprising:

openable and closeable valve means;

a valve having open valve means allowing compressed air to flow from upstream of the valve to downstream of the valve;

a valve having closed valve means preventing compressed air to flow from upstream of the valve to downstream of the valve;

spring means in the valve providing a spring force for biasing the valve means from closed to open;

said spring force being selected for being capable of opening closed valve means when air pressures upstream and downstream of the closed valve means are equalized and being selected for being incapable of opening closed valve means when air pressures upstream and downstream of the closed valve means are unequalized by an amount caused by air leakage downstream of the closed valve means;

electromagnetic means in the valve for overcoming the spring force for closing and holding the valve closed during electrical energization of the electromagnetic means; and electrical terminals in the valve for use in electrical energization of the electromagnetic means, whereby upon cessation of electrical energization of the electromagnetic means following electrical energization thereof the spring force is capable of opening the closed valve means when air pressures upstream and downstream of the closed valve means are equalized but is incapable of opening the closed valve means when air pressures upstream and downstream of the closed valve means are unequalized by an amount caused by air leakage downstream of the closed valve means.

12. A shutoff valve as claimed in claim 11, in which:

said valve means move in a downstream direction in moving from open to closed; and air deflector means are positioned upstream of said valve means for deflecting compressed air flow for preventing air flow from closing said valve means.

13. A shutoff valve as claimed in claim 12, in which:

said valve means have a circular perimeter;

said air deflector means have an annular passage axially aligned with said circular perimeter and of larger diameter than said circular perimeter; and compressed air flowing from said annular passage bypasses the circular perimeter of said valve means.

14. A shutoff valve as claimed in claim 13, in which:

said air deflector means has a plurality of uniformly-spaced holes communicating with said annular passage for feeding compressed air into said annular passage.

15. A shutoff valve as claimed in claim 13, in which:

said valve means has a circular upstream working surface encircled by said circular perimeter;

said air deflector has a central deflector element encircled by said annular passage; and when said valve means are open, said circular upstream working surface rests against said central deflector element with said annular passage being concentric therewith and with said circular perimeter spaced radially inwardly from said annular passage.

16. A shutoff valve for use in a marine seismic airgun array for shutting off leakage of compressed air, said valve comprising:

a housing having an inlet and an outlet;

said housing having passage means between the inlet and the outlet;

said passage means including a valve seat;

a movable valve member in the housing;

said valve member being movable in a first direction to an open position away from the seat for allowing communication through the passage means between the inlet and the outlet;

spring means in the housing for urging the valve member in the first direction;

said valve member being movable in a second direction opposite to said first direction to close it against the seat for blocking communication through the passage means;

electromagnetic means in the housing;

said valve member being movable by electrical energization of the electromagnetic means for overcoming urging of the spring means to move the valve member in the second direction to close it against the seat and to hold it against the seat; and said spring means being selected to have a spring force capable of moving the valve member from closed to open when air pressures downstream and upstream of the closed valve member are equalized and said spring force being incapable of moving the valve member from closed to open when air pressures downstream and upstream of the valve are unequalized due to air leakage occurring downstream of the valve.

17. A shutoff valve as claimed in claim 16, in which:

said valve member is aligned with said inlet;

said valve member in moving in said second direction is moving away from the inlet; and air deflector means communicate with said inlet for deflecting away from said valve member compressed air flowing through said inlet into the valve;

thereby preventing compressed air flowing through said inlet from moving said valve member in said second direction.

18. A shutoff valve as claimed in claim 17, in which:

said electromagnetic means include an armature movable in said first and second directions with a winding electromagnetically coupled to said armature;

a valve stem extends from said valve member to said armature for mechanically connecting said valve member to said armature;

said passage means include a chamber and said valve stem extends through said chamber;

a barrier wall is positioned between said chamber and said armature; and said barrier wall has an opening therein with said valve stem extending through said opening for guiding said valve stem, whereby said barrier wall prevents compressed air flowing into the chamber from impacting against said armature, and whereby energization of the winding in moving the armature in said second direction applies tension force "F" to said valve stem.

19. A shutoff valve for use in a marine seismic airgun array for shutting off compressed air from an outlet experiencing air leakage downstream from the outlet comprising:

a housing having an inlet, an outlet and a passageway normally providing communication between said inlet and outlet and wherein a direction of downstream flow of compressed air is from said inlet to said outlet;

a valve seat in said passageway;

a valve member movable into closed position in contact with said seat for blocking communication between said inlet and outlet;

said valve member being movable into open position away from said seat for allowing communication between said inlet and outlet;

spring means exerting opening force on said valve member for urging said valve member into open position away from said seat;

electromagnetic means coupled to said valve member for overcoming said spring means upon energization of said electromagnetic means for moving said valve member into closed position in contact with said seat and for holding said valve member in closed position in contact with said seat;

a closing force being exerted on said valve member in closed position by air pressure in said inlet exceeding air pressure in said outlet; and said spring means being selected for exerting an opening force (1) which is capable of overcoming friction for moving said valve member from closed to open position when air pressures in said inlet and outlet are equalized and (2) which is overcome by said closing force for allowing said valve-member to remain in closed position subsequent to deenergization of said electromagnetic means when air pressure in said inlet exceeds air pressure in said outlet by a predetermined amount indicative of an air leakage problem downstream of the shutoff valve.

20. A shutoff valve as claimed in claim 19, in which:

air deflector means upstream of said valve member configure downstream flow of compressed air through said passageway for preventing downstream flow of compressed air from moving the valve member from open position into closed position.

21. A shutoff valve as claimed in claim 20, in which:

said valve member in open position rests against said air deflector means; and said air deflector means directs flow of compressed air to bypass said valve member.

22. A shutoff valve as claimed in claim 19, in which:

said valve seat has generally a truncated conical configuration which converges in a closing direction;

said closing direction is in the direction of downstream flow of compressed air past the valve seat;

said valve member has generally a truncated conical seating surface which converges in said closing direction;

said valve member moves in said closing direction in moving said seating surface into closed position in contact with said seat and said valve member moves in an opening direction opposite to said closing direction in moving said seating surface into open position away from said seat;

said electromagnetic means include an armature and an electrically energizable winding electromagnetically coupled with said armature upon energization of said winding:

said armature is positioned away from said seat in said closing direction;

a valve stem extends in said closing direction from said valve member to said armature for mechanically connecting the valve member to the armature; and electrical energization of said winding moves said armature in said closing direction and thereby applies tension force F to the valve stem for pulling the valve member to bring the seating surface of the valve member into contact with the seat.

* * * * *